(12) United States Patent
Lettau

(10) Patent No.: US 8,751,947 B2
(45) Date of Patent: Jun. 10, 2014

(54) VISUAL AND FUNCTIONAL TRANSFORM

(75) Inventor: Tyler J. Lettau, Hercules, CA (US)

(73) Assignee: Adobe Systems Incorporated, San Jose, CA (US)

(*) Notice: Subject to any disclaimer, the term of this patent is extended or adjusted under 35 U.S.C. 154(b) by 740 days.

(21) Appl. No.: 12/072,922

(22) Filed: Feb. 29, 2008

(65) Prior Publication Data

US 2013/0125032 A1    May 16, 2013

(51) Int. Cl.
*G06F 3/048*    (2013.01)

(52) U.S. Cl.
USPC .................................................. 715/764

(58) Field of Classification Search
USPC .................................................. 715/764, 810
See application file for complete search history.

(56) References Cited

U.S. PATENT DOCUMENTS

| | | | |
|---|---|---|---|
| 6,714,214 B1 | 3/2004 | DeMello et al. | |
| 6,741,262 B1 | 5/2004 | Munson et al. | |
| 6,791,529 B2 | 9/2004 | Shteyn | |
| 7,093,201 B2* | 8/2006 | Duarte | 715/853 |
| 7,730,401 B2* | 6/2010 | Gillespie et al. | 715/702 |
| 7,769,794 B2* | 8/2010 | Moore et al. | 707/831 |
| 2007/0061732 A1* | 3/2007 | Bobbin et al. | 715/739 |
| 2007/0136681 A1 | 6/2007 | Miller | |
| 2007/0150485 A1* | 6/2007 | Uittenbogaard | 707/100 |
| 2007/0150839 A1 | 6/2007 | Danninger | |
| 2007/0157127 A1 | 7/2007 | Moehrle | |
| 2007/0168369 A1 | 7/2007 | Burns | |
| 2007/0198949 A1* | 8/2007 | Rummel | 715/810 |
| 2009/0158192 A1* | 6/2009 | De Peuter et al. | 715/776 |

* cited by examiner

*Primary Examiner* — Omar Abdul-Ali
*Assistant Examiner* — Haimei Jiang
(74) *Attorney, Agent, or Firm* — Wolfe-SBMC

(57) ABSTRACT

Techniques for a visual and functional transform are described, including presenting a graphical representation including a first level and a second level, the first level and the second level each including an option associated with an object, receiving an input indicating selection of the option, and selection of the option initiates expansion of the graphical representation from the first level to the second level, and modifying a visual characteristic associated with the first level to graphically distinguish the first level from the second level when the expansion occurs.

18 Claims, 12 Drawing Sheets

VISUAL AND FUNCTIONAL TRANSFORM

FIELD OF THE INVENTION

The present invention relates generally to computer programs and software architecture. More specifically, visual and functional transform techniques are described.

BACKGROUND OF THE INVENTION

Selection of menu options in an application display has been problematic using conventional techniques. Conventionally, the selection of editing, formatting or other application tools involved accessing a drop down user interface menu. Some conventional solutions present drop-down menus that, when presented, allow a user to select one or more options, but the options are often limited in quantity and type. There are other problems or limitations associated with typical drop down menus.

Some conventional drop down menus are limited in functionality and, in some cases, altogether eliminate the context of a user's workflow when working on a document, image, file, graphic, or the like. When conventional solutions (e.g., drop down menu, dialog boxes) are used to present (i.e., display) and invoke an option, upon selection of an option, one or more functions are immediately invoked and the on-screen presentation changes or disappears altogether. Thus, a user may not be able to view previously presented information, which may result in the loss of context or create additional efforts to recall previous actions. For example, when an "edit" option is selected from a drop down menu, a user may follow a series of prompts to select a function, action, or other option (hereafter "option"). After selecting an option, the original presentation of the drop down menu changes or altogether disappears, thus forcing invocation of the drop down menu again in order to select another option. Thus, conventional solutions abruptly interrupt user workflow, create time delays, and require labor-intensive and inefficient efforts.

Further, conventional techniques are typically devoid of visual indications that allow ready identification of an option being invoked. Further, conventional solutions provide no indicator, visual or otherwise, that allow a user to identify workflow direction or history.

Thus, what is needed is a visual options tool without the limitations or problems of conventional techniques.

BRIEF DESCRIPTION OF THE DRAWINGS

Various embodiments of the invention are disclosed in the following detailed description and the accompanying drawings.

DETAILED DESCRIPTION

Figure 1:
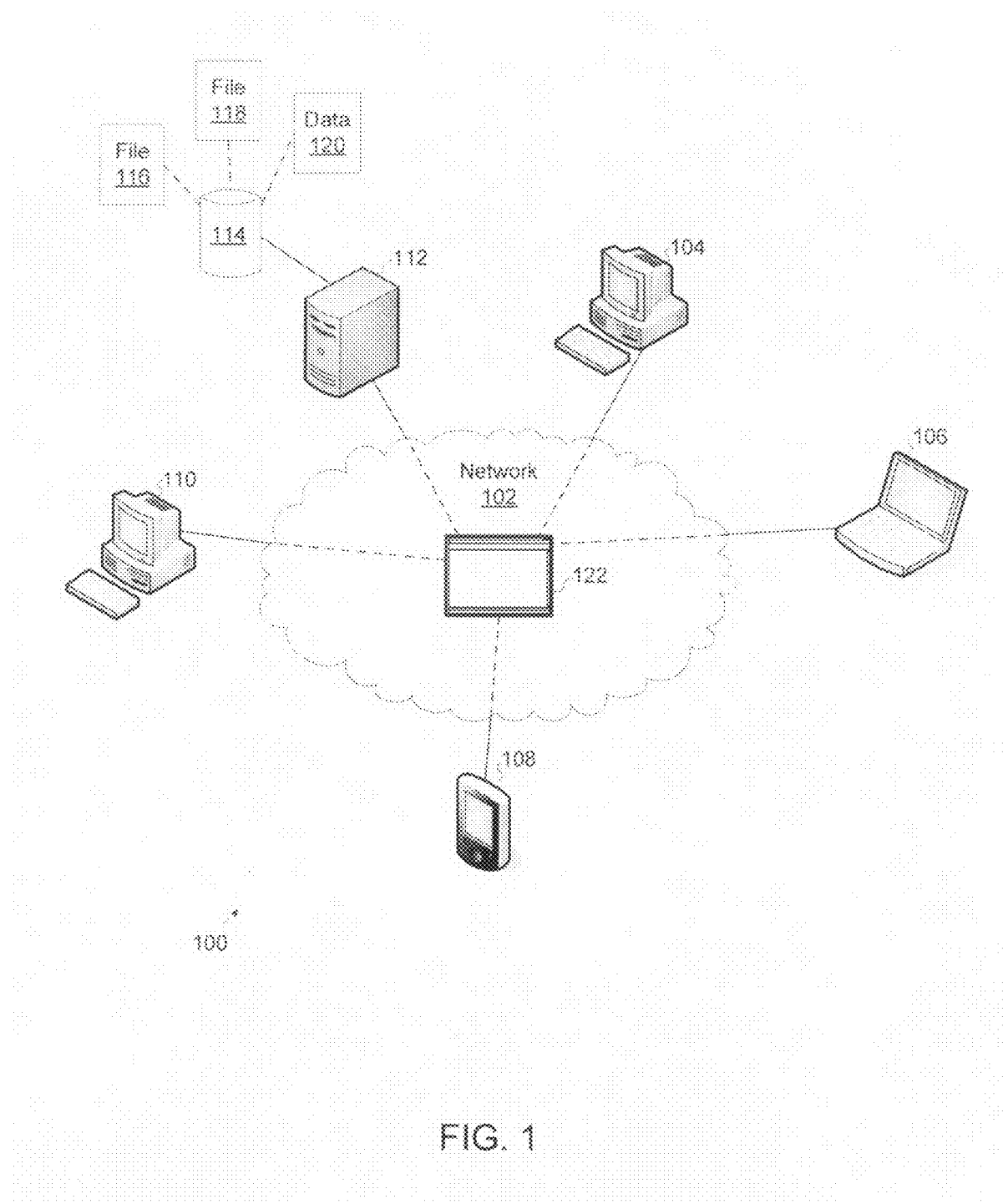
FIG. 1 illustrates an exemplary system configured to implement a visual and functional transform.

Various embodiments or examples may be implemented in numerous ways, including as a system, a process, an apparatus, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided as examples and the described techniques may be practiced according to the claims without some or all of the accompanying details. For clarity, technical material that is known in the technical fields related to the embodiments has not been described in detail to avoid unnecessarily obscuring the description.

In some examples, the described techniques may be implemented as a computer program or application ("application") or as a module or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including C, Objective C, C++, C#, FleX™, Java™, Javascript™, Ajax, COBOL, Fortran, ADA, XML, HTML, DHTML, XHTML, HTTP, XMPP, and others. Design, publishing, and other types of applications such as Dreamweaver®, Shockwave®, Flash®, and Fireworks® may also be used to implement the described techniques. The described techniques may be varied and are not limited to the examples or descriptions provided.

Visual and functional transform techniques are described. Various techniques are described, including presenting a graphical representation (i.e., visual and functional transform) that is visually configured to expand to one or more levels. A level, in some examples, may refer to one or more tiers of options that may be selected to perform an action or other function associated with an object (e.g., image, graphic, picture, photograph, layered image, or the like) when a user provides an input using a visual and functional transform (i.e., graphical representation). In some examples, a graphical representation may be presented or displayed to provide visual, audio, or other indicators of previous or current selections when one or more options are selected. Further, a graphical representation may refer to a displayed visual indicator that may be invoked for selecting an option and, once invoked, provides a displayed, visual representation of previous options selected by a user, providing a visual tool that may be used to navigate back to previously presented options menus. In other examples, levels of a graphic representation may include one or more options associated with an image. When an element (i.e., any type of displayed graphical or visual item presented in connection with a graphic representation) of a graphic representation is selected, one or more levels may be invoked. Alternatively, a widget (i.e., an element that, when presented, provides functionality for a user to invoke when an input is received from a user interface control (e.g., a slide bar, a slide tool, a drop down menu, a radio button, a check box, a text input field, or others)) may be used to provide input indicating manipulation of a parameter associated with an object. For example, graphical representations such as those described below may be used to present options for modifying color channel values of an object. Options may be presented in a persistent, semi-persistent, or non-persistent manner, enabling continued viewing of options or options menus that were previously navigated by a user. In other examples, the described techniques may be implemented differently in design, function, layout, order, or configuration and are not limited to the examples provided.

FIG. 1 illustrates an exemplary system configured to implement a visual and functional transform. Here, system 100 includes network 102, clients 104-110, server 112, and repository 114, which may be implemented and configured to store data (e.g., files 116-118, data 120, or other data in various types of formats). In some examples, graphical user interface ("interface") 122 may be presented on one, some, or none of clients 104-110 or server 114. In some examples, interface 122 may be accessed from any type of endpoint, device, client, peer, or the like, including clients 104-110. Clients 104-110 may be wired, wireless, mobile, and in data communication with server 112 using any type of public or private data network or topology. In other examples, the number, type, configuration, and topology of system 100, network 102, clients 104-110, and server 112 may be varied and are not limited to the descriptions provided.

Here, any of clients 104-110 and server 112 may access files 116-120 using interface 122. In some examples, interface 122 may be associated with a common, shared, or otherwise connected ("connected") application that allows users to view, read, and access other users' input (i.e., edits, additions, deletions, or other modifications). For example, a user on client 104 may be working with an application rendering interface 122 to access file 118 from server 112 using data stored in and accessed from repository 114. While working with interface 122, accesses to file 118 from, for example, clients 106-110 may be viewed using the techniques described herein. Further, accesses may be viewed as a history or list of accesses to a given file and, when an individual access is performed, data retrieved in response to the access may be presented, rendered, displayed, or otherwise viewed. Still further, a visual element disposed over a visual indicator may be manipulated to navigate through a history of accesses to, for example, files 116-120. In other examples, system 100 and the above-described elements may be implemented differently and are not limited to the descriptions provided.

Figure 2:
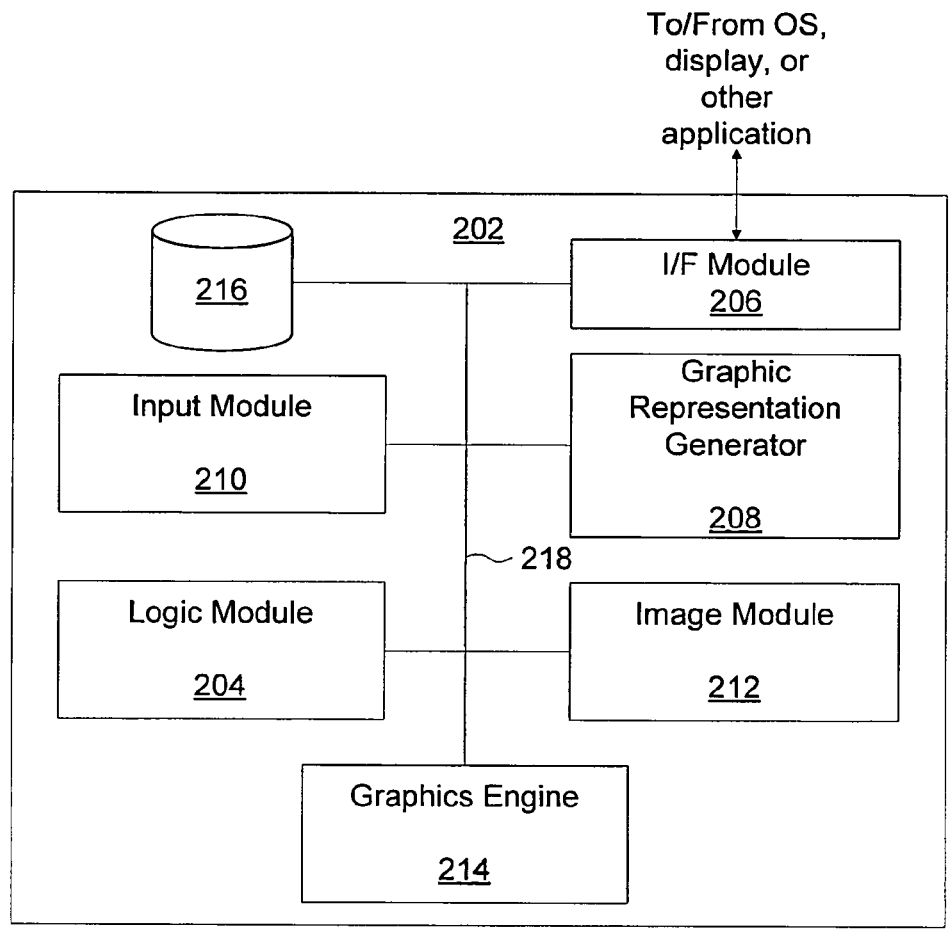
FIG. 2 illustrates an exemplary application architecture configured to implement a visual and functional transform.

FIG. 2 illustrates an exemplary application architecture configured to implement a visual and functional transform. Here, application 202 includes logic module 204, interface (I/F) module 206, graphic representation generator 208, input module 210, image module 212, graphics engine 214, repository 216, and bus 218. In some examples, repository 216 may be implemented similarly or substantially similarly to repository 114 (FIG. 1) as a database, data mart, data warehouse, storage area network (SAN), redundant array of independent disks (RAID), or other storage facility. In other examples, repository 216 may be implemented differently than as described above.

Here, logic module 204 is configured to manage interface (I/F) module 206, graphic representation generator 208, input module 210, image module 212, graphics engine 214, and repository 216 by generating and transmitting control signals and data over bus 218. As described below, logic module 204, in association with some, none, or all of interface (I/F) module 206, graphic representation generator 208, input module 210, image module 212, graphics engine 214, and repository 216, may be used to implement the described techniques.

In some examples, I/F module 206 provides data input from and output to an operating system, display, or other application configured to implement (e.g., compiling, executing, and running) application 202. In some examples, data input to I/F module 206 may be a parameter associated with a display. In other examples, data input to or information output from I/F module 206, input module 210, graphic representation generator 208 and image module 212 may be received or sent using graphics engine 214.

In some examples, a graphical element may be generated by graphic representation generator 208 and rendered and presented (i.e. displayed) by graphics engine 214 and I/F module 206. I/F module 206 and input module 210 may be configured to receive, interpret, handle, or otherwise manage input received from an interface (e.g., interface 122 (FIG. 1)) when a graphical representation is selected. In other examples, application 202 and the above-described elements may be implemented differently and are not limited to the descriptions provided.

Figure 3A:
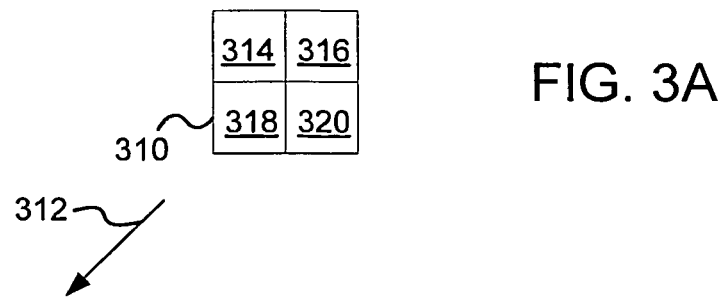
FIG. 3A illustrates an exemplary visual and functional transform.

FIG. 3A illustrates an exemplary visual and functional transform. Here, graphical representation (i.e., visual and functional transform) 310 is shown configured for expansion in the direction of arrow 312. In some examples, graphical representation 310 may be presented in an interface (e.g., interface 122 (FIG. 1)) and, when an input is received from a user (e.g., a computer mouse click, keyboard stroke, or others), graphical representation 310 may expand in the direction of arrow 310. In other examples, graphical representation 310 may be configured to change shape, size, or other aspects and is not limited to the examples described. Here, graphical representation 310 is presented as a quadrant-based geometric shape, with cells 314-320. The number, size, geometric shape, and functions or options associated with cells 314-320 may be varied and are not limited to the example shown. In some examples, cells 314-320 may be configured to represent one or more options that, when selected, are used to invoke an operation, menu item, or other function. As an example, cell 314 may be presented with an icon, text, image, graphic, or other visual indicator that represents an option associated with changing a color channel of an object. As another example, cell 316 may be presented similarly to cell 314, providing an option for a user to select that allows surface texture of an object to be modified. As yet another example, cell 318 may be presented similarly to cells 314-316 and which allows for a user to select an option that modifies brightness of an object. Still further, cell 320 may be presented similarly to cells 314-318 to provide an option for adjusting the luminosity of an object or element within an object. In other examples, different functions, attributes, characteristics, or other options may be presented using graphical representation 310.

Here, the configuration of the appearance of graphical representation 310 may be varied and is not limited to the description provided. As shown here, graphical representation 310 includes elements (i.e., cells 314-320) that may be functionally coupled to one or more options that are presented on, for example, an interface, when a user input is received. In other examples, the quantity of cells 314-320 may be varied and is not limited to the descriptions provided. Further, elements 314-320 may be used to present options associated with various aspects, features, functions, attributes, characteristics, parameters, or other options (e.g. color channel values, color, rotation, size, animation, luminosity/brightness, or other types of effects, without limitation) of an object (not shown).

In some examples, graphical representation 310 may be invoked through any type of input, including one or more key strokes, menu selections, mouse clicks, or others. Graphical representation 310 may be invoked differently and is not limited to the examples shown and described.

Figure 3B:
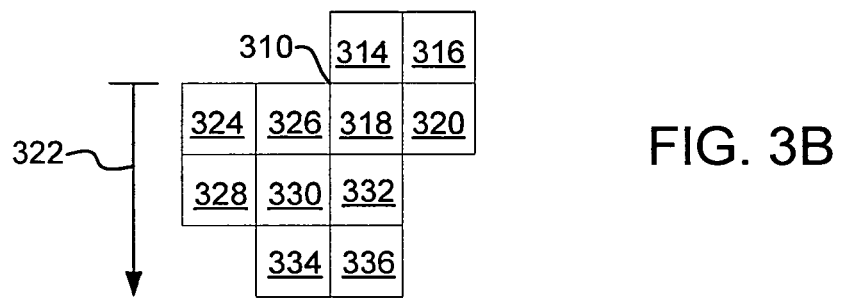
FIG. 3B is another illustration of an exemplary visual and functional transform.

FIG. 3B is another illustration of an exemplary visual and functional transform. Here, graphical representation (i.e., visual and functional transform) 310 is shown after being configured (i.e., expanding in direction of arrow 312 (FIG. 3A)), presenting cells 324-336, which are presented in the direction of arrow 322. In some examples, when an interaction (i.e., input) with cell 318, for example, is detected cells 324-336 are presented. In other examples, cells 324-336 may be presented differently and are not limited to those provided.

As shown, when cell 318 is selected, cells 324-336 are invoked, causing graphical representation 310 to expand from one to two "levels" or "tiers" in direction 322. In some examples, cells 314-320 may be presented as a level of graphical representation 310, and cells 324-336 may be presented as another level. Alternatively, the number of cells and levels may be varied depending upon the levels of functions or options associated with a given option selected. For example, if cell 318 is associated with color channel values (e.g., RGB (i.e., red, green, blue)) of an object, cells 324-336 may represent specific color channel values that may be selected by a user. Cells 324-336 may also represent other options that, when selected, present another level of cells or a control widget that may be manipulated by using, for example, a keyboard, a computer mouse, or other input device. In other examples, the quantity of levels shown here with graphical representation 310 may be varied and are not limited to the descriptions provided.

In some examples, when an option (i.e., one of cells 314-320 or 324-336) is selected, the appearance or presentation of unselected options (i.e., cells, generally) may be modified in appearance. For example, if cell 314 is selected, unselected elements 3116-320 and 324-336 may be "ghosted" (i.e., "ghosting" may refer to modifying various visual characteristics of an element in order to more prominently present, visually indicate, or graphically distinguish a selected element) or otherwise modified in appearance using various techniques (e.g., highlighting, adjusting opacity percentages or values, varying the line weight of an outlined border, outlining using a pixel border, outlining in broken line or a moving "ant" line (i.e., a broken or dashed line that appears to move around the border of an unselected element), and others), as described in greater detail below in connection with FIG. 3C.

Referring back to FIG. 3B, cells 314-320 and 324-336 may be configured to indicate one or more additional levels of options associated with an option related to a selected cell. In some examples, "levels" may refer to different sets of functions, processes, or options ("options") that are presented as different shapes that appear in connection with a given geometric shape (i.e., visual and functional transform). In other words, as a user selects an option, subsequent options may be presented as different shapes and previous levels or shapes may be modified in appearance (e.g., ghosting, highlighting, or using other techniques) to graphically distinguish a current set of options from a previous set of options, providing a visual history of previously selections. In other examples, graphical representation 310 and the above-described elements may be varied in layout, configuration, function, or implementation, and are not limited to the descriptions provided.

Figure 3C:
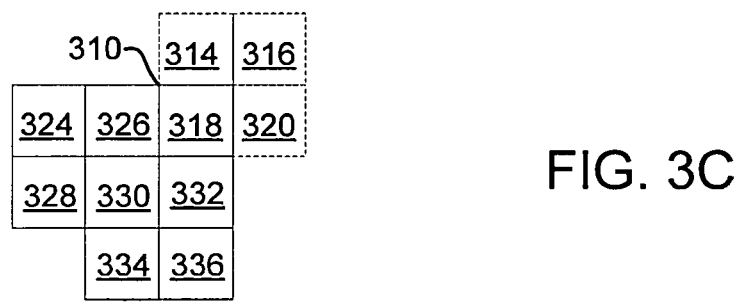
FIG. 3C is a further illustration of an exemplary visual and functional transform.

FIG. 3C is a further illustration of an exemplary visual and functional transform. Here, graphical representation 310 with cells 314-320 and 324-336 are shown. In some examples, cells 314-316 and 320 may be ghosted when cell 318 is selected. Cells 314-320 may be configured as one level of graphical representation 310 and cells 324-336 may be configured as another level. When one of cells 314-320 is selected, another level (e.g., cells 324-336) may be presented and the unselected cells of the previous level are ghosted. Further, a selected cell (e.g., cell 318) may be visually modified to provide a visual indication of selection. In other examples, the above-described techniques may be varied and are not limited to the examples provided.

As shown here, graphical representation 310 includes cells 314-320 and 324-336. The quantity, size, shape, function, or other characteristics of cells 314-320, 324-336 may be varied and are not limited to the examples provided. Here, cell 318 is selected and unselected cells 314-316 are visually modified to be opaque and to appear as though receding (i.e., ghosted) into the background of, for example, an interface (e.g., interface 122 (FIG. 1)). Further, when cell 318 is selected, cells 324-336 appear (i.e., are presented) and, in some examples, when another of cells 324-336 are selected, another level of cells or controls may appear, as described below in connection with FIG. 3D. In other examples, the above-described techniques may be varied and are not limited to those shown or described.

Figure 3D:
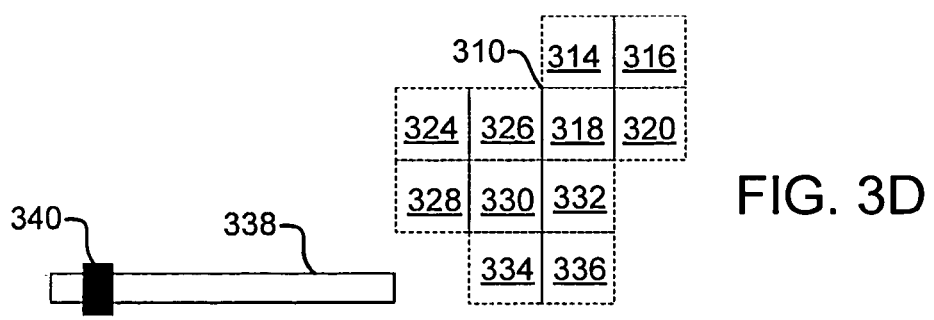
FIG. 3D is yet another illustration of an exemplary visual and functional transform.

FIG. 3D is yet another illustration of an exemplary visual and functional transform. Here, graphical representation 310 is shown with cells 314-320 and 324-336 appearing ghosted when, for example, cell 318 is selected. In some examples, by modifying the opacity or transparency of graphical representation 310, a user may view previous selections (i.e., cells) while remaining contextually focused on a next level of options (i.e., cells) or controls (e.g., slide bar 338, slide indicator 340, or others). As an example, when cell 318, cells 314316 and 320 are ghosted, and cells 324-336 are presented. As a further example, when one of cells 324-336 is selected, slide bar 338 and slide indicator 340 are invoked and presented while ghosting cells 324-336, for example, layered over an object in an interface (e.g., interface 122 (FIG. 1) associated with an authoring, editing, or other type of application. Further, selected cells may be visually distinguished from other ghosted cells or other elements, in order to provide a user with the ability to view previously selected options and present an on-screen element (e.g., graphical representation 310) to allow further selection of other options associated with previously presented levels.

Here, slide bar 338 and slide indicator 340 may be implemented as a control mechanism to modify a parameter associated with an object. In some examples, slide bar 338 and slide indicator 340 may be implemented using different sizes, shapes, functions, or other features apart from those shown or described. For example, slide bar 338 or slide indicator 340 may be implemented to appear using different geometric shapes, sizes, as an icon or avatar, an input text field, or others. In other examples, graphical representation 310, slide bar 338, and slide indicator 340 may be designed, implemented, or function differently and are not limited to the descriptions provided.

Figure 3E:
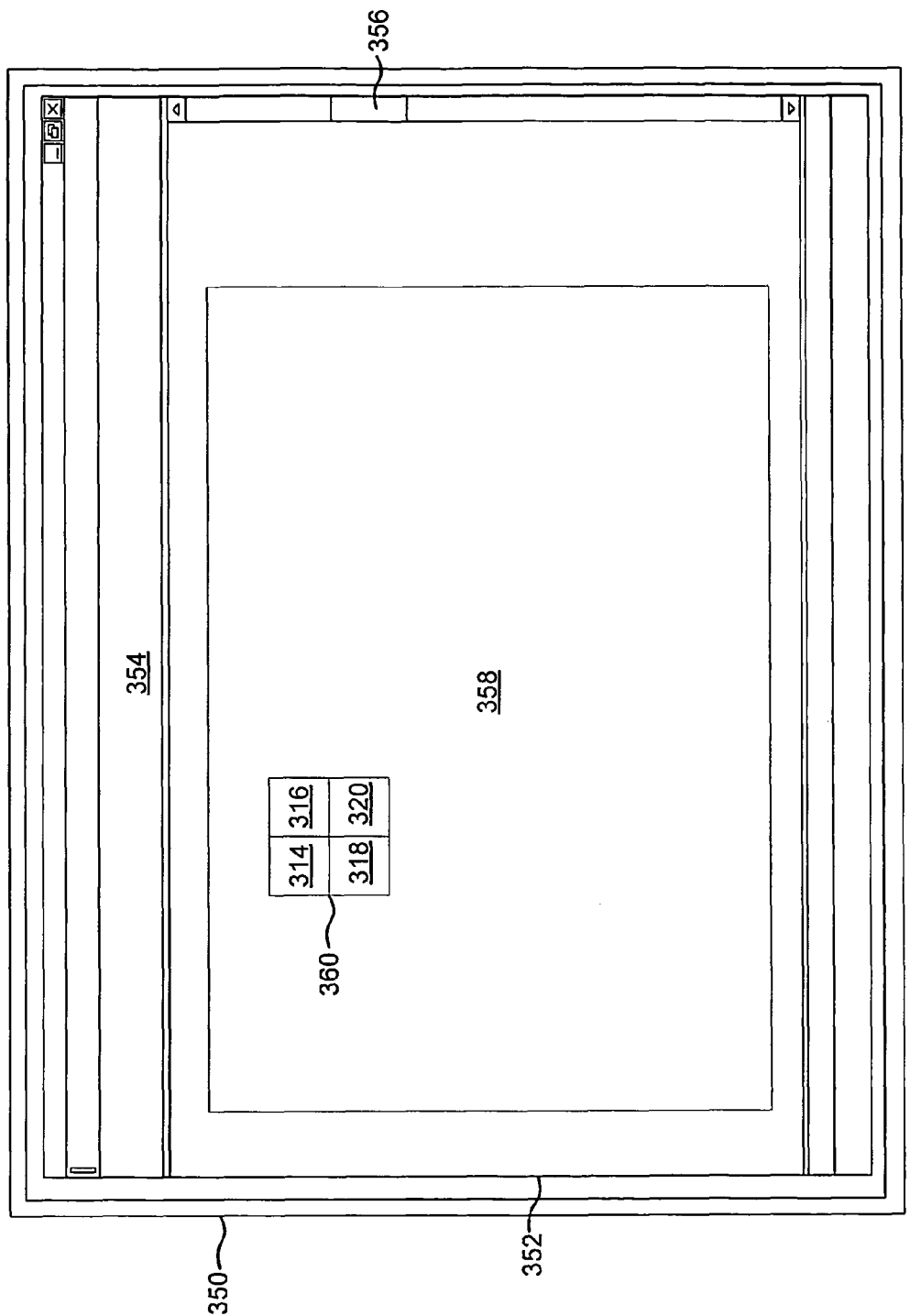
FIG. 3E illustrates an exemplary interface having a visual and functional transform.

FIG. 3E illustrates an exemplary interface having a visual and functional transform. Here, interface 350 includes display 352, scroll bar 356, elements 314-320, panel 354, graphical representation 360, and object 358. Here, elements 314-320, graphical representation 360 are presented over object 358 in display 352. In some examples, elements 314-320 and graphical representation 360 may be presented in panel 354. In other examples, elements 314-320 and graphical representation 360 may be presented elsewhere in interface 350 and are not limited to the examples provided.

Here, graphical representation 360 is presented as a quadrant-based geometric shape. In some examples, configuration of graphical representation 360 may be varied and is not limited to the descriptions provided. As shown here, graphical representation 360 includes elements 314-320. In other examples, elements 314-320 may be varied in quantity, size, shape, design, layout, function, and other aspects and are not limited to the examples shown. Further, elements 314-320 may be presented to provide one or more options (e.g. color, rotation, size, special effects, or others) associated with object 358. In other examples, elements 314-320 may indicate other options associated with object 358 and are not limited to the descriptions provided. As an example, graphical representation 360 may be invoked through a series of key selections. In other examples, graphical representation 360 may be invoked through selection of a menu. Still further, interface 350 and the above-described elements may be varied in implementation, configuration, design, or other aspects and are not limited to the examples shown and described.

Figure 3F:
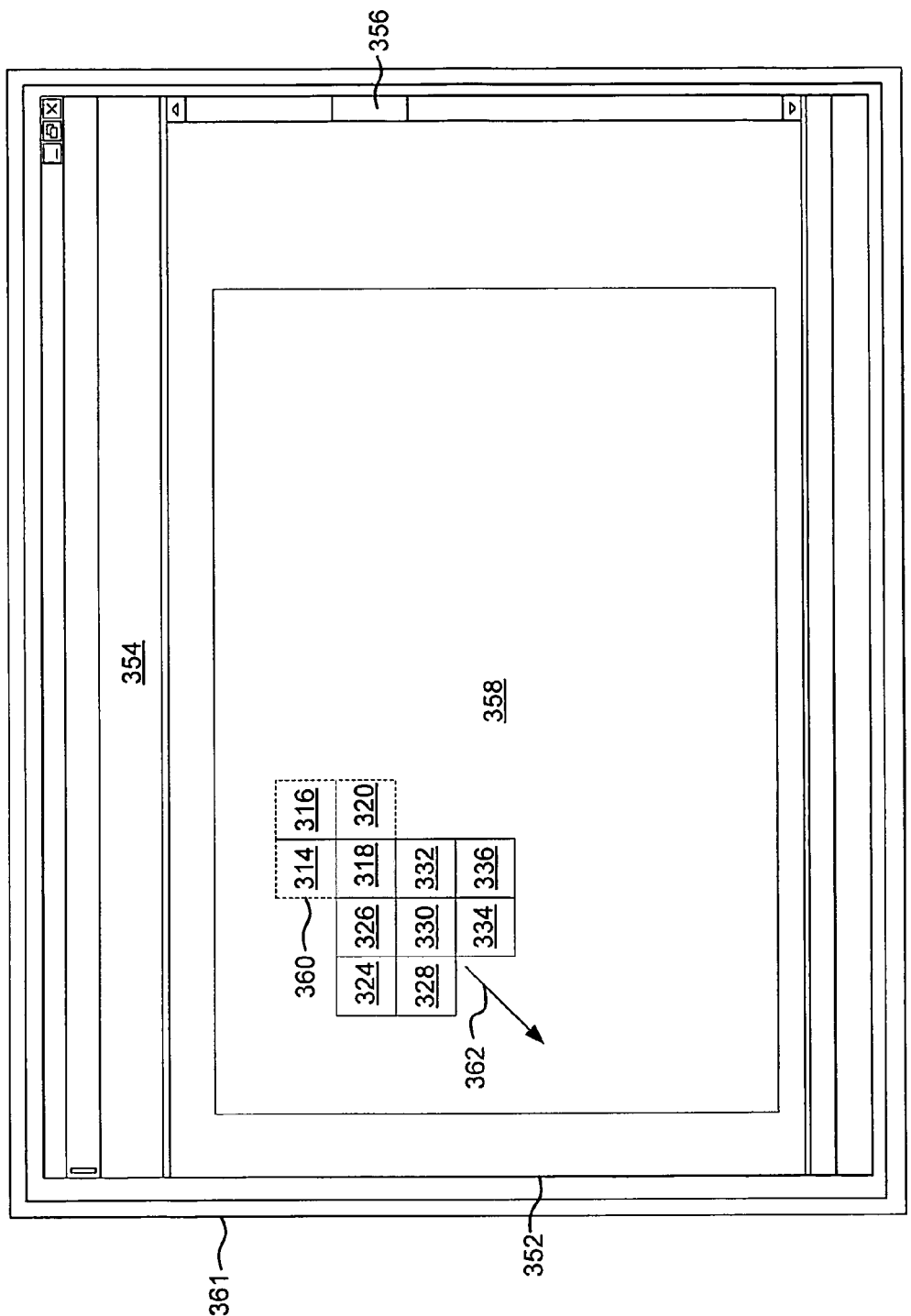
FIG. 3F illustrates a further exemplary interface having a visual and functional transform.

FIG. 3F illustrates a further exemplary interface having a visual and functional transform. Here, interface 361 includes display 352, panel 354, scroll bar 356, object 358, graphical representation 360, and elements 314-320 and 324-336. In some examples, elements 314-320 and 324-336, graphical representation 360, and object 358 are presented in display 352. Elements 314-320 and 324-336 and graphical representation 360 may be presented on panel 354. In other examples, elements 314-320 and 324-336 and graphical representation 360 may be presented elsewhere in interface 361 and are not limited to the examples provided.

As shown here, graphical representation 360 includes elements 314-320 and 324-336. In other examples, the quantity of elements 314-320 and 324-336 may be varied and is not limited to the examples provided. Here, element 318 is selected (i.e., in response to an input and visually distinguished from unselected elements 314-316 and 320). As shown, when element 318 is selected, elements 324-336 are invoked and graphical representation 360 expands from one level to another level in the direction of arrow 362. In other examples, graphical representation 360 may expand in a direction other than that shown. Here, elements 314-320 represent a level of options associated with graphical representation 360. Elements 324-336 represent another level of options associated with graphical representation 360. Alternatively, different levels may be presented and are not limited to the examples shown.

In some examples, when element 318 is selected, unselected elements 314-316 and 320 are "ghosted," as described above. When element 318 is selected, elements 324-336 are presented and displayed as though expanding graphical representation 360 in the direction of arrow 362. By ghosting elements 314-316 and 320, visually distinguishing element 318 (e.g., using shading, cross-hatching, ghosting, or other techniques), and presenting another level of options (i.e., elements 324-336), a visual archive or historical representation of previous option selections may be achieved, as described above. In other examples, interface 361 and the above-described elements may be varied and are not limited to the description provided.

Figure 3G:
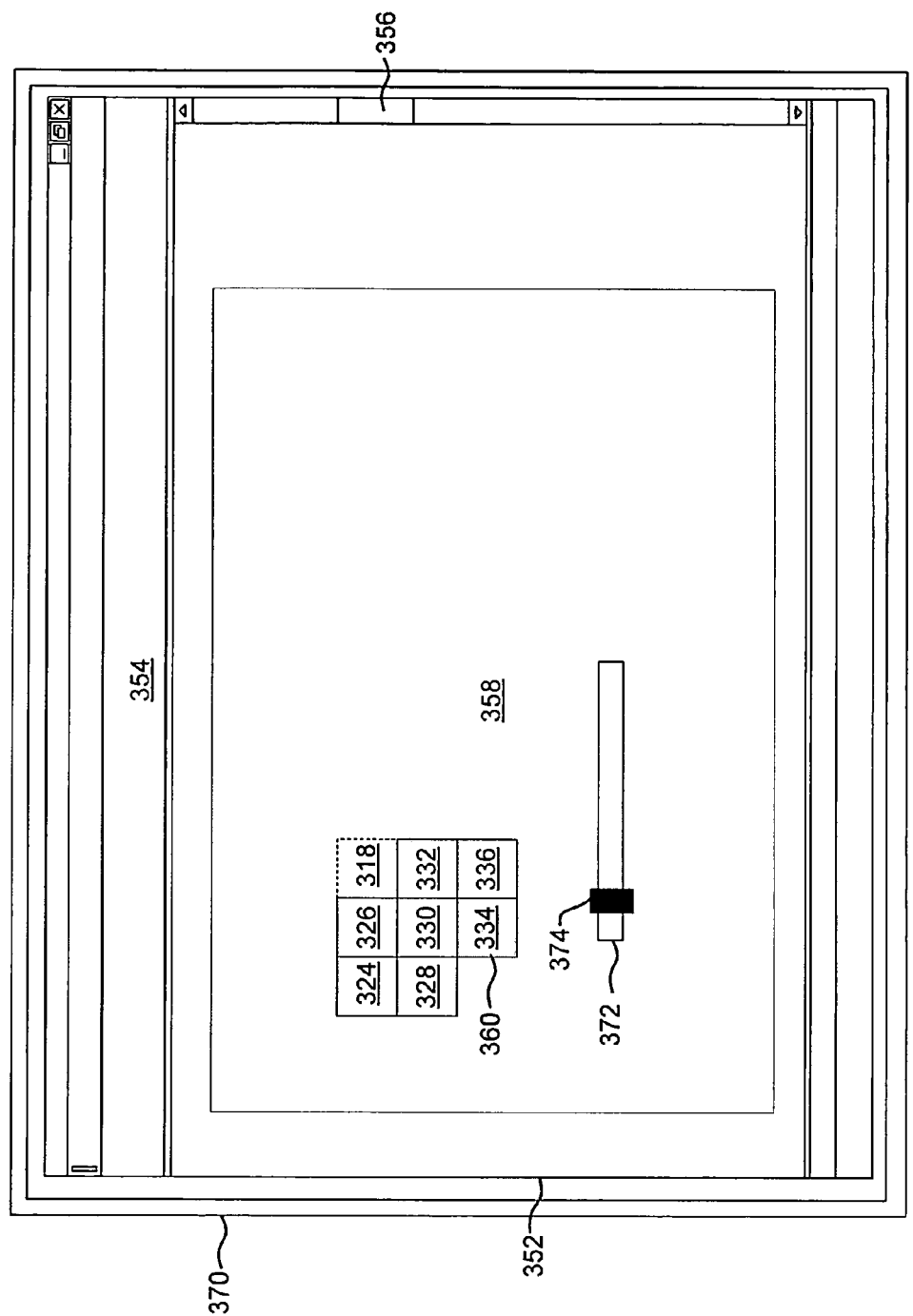
FIG. 3G illustrates another exemplary interface having a visual and functional transform.

FIG. 3G illustrates another exemplary interface having a visual and functional transform. Here, interface 370 includes display 352, panel 354, scroll bar 356, elements 318 and 324-336, graphical representation 360, slide bar 372, slide indicator 374, and object 358. Here, elements 318 and 320-336, graphical representation 360, slide bar 372, slide indicator 374, and object 358 are presented in display 352. In some examples, elements 318 and 320-336, slide bar 372, slide indicator 374, and graphical representation 360 may be presented on panel 354. In other examples, elements 318 and 320-336, slide bar 372, slide indicator 374, and graphical representation 360 may be presented elsewhere in interface 350 and are not limited to the examples provided.

As shown here, graphical representation 360 includes elements 318 and 320-336. In other examples, the quantity of elements 318 and 320-336 may be varied and is not limited to the descriptions provided. Here, element 318 may be presented selected (i.e., visually distinguished from unselected elements 324-336, ghosted, or otherwise). As shown here, when one or more of elements 320-336 is selected, unselected elements may be ghosted or faded entirely or partially. As shown here, when, for example, element 328 is selected, slide bar 372 and slide indicator 374 are invoked. Here, slide bar 372 and slide indicator 374 may be widgets, items, elements, or other displayed controls associated with options that are invoked to modify a parameter associated with object 358. In some examples, slide bar 372 and slide indicator 374 may be invoked as shown. In other examples, slide bar 372 and slide indicator 374 may be invoked and presented differently and are not limited to the examples shown. For example, controls (e.g., slide bar 372 and slide indicator 374) may be rendered as a radial pattern of elements, icons, or manual alphanumeric text input fields associated with options for manipulating parameters associated with object 358. In other examples, when one or more of elements 324-336 is selected, other types of controls invoked and are not limited to the descriptions provided.

Figure 4A:
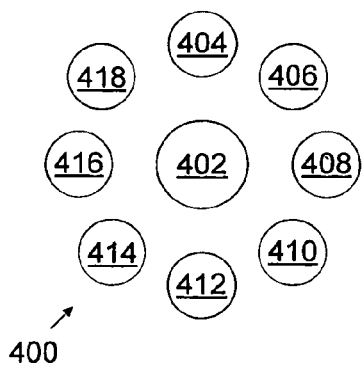
FIG. 4A illustrates an alternative exemplary visual and functional transform.

FIG. 4A illustrates an alternative exemplary visual and functional transform. Here, graphical representation 400 includes elements 402-418. In some examples, graphical representation 400 may be presented when invoked by a keystroke, mouse click, drop-down menu selection, text field input or other user or system-specified input is provided. When invoked, graphical representation 400 may be configured to present elements 402-418, each of which may be implemented to provide one or more other elements or to present a control widget, panel, or other function that may be used, when selected, to modify an aspect, characteristic, attribute, or other parameter of an object (not shown). Graphical representation 400 and elements 402-418 may be presented in any location on an interface used, for example, with an application configured to modify, edit, or author objects. In other examples, graphical representation 400 and elements 402-418 may be presented using different shapes, sizes, quantities, positions, options, functions, or other features apart from those described.

As an example, graphical representation 400 may be presented as a radial-based geometric shape as opposed to a quadrant or grid-based shape, as described above in connection with FIGS. 3A-3D. Referring back to FIG. 4A, the configuration of graphical representation 400 and elements 402-418 may be varied in size, shape, function, or other features beyond the description provided. Here, elements 402-418 may be configured to invoke one or more options associated with various attributes, characteristics, or parameters associated with an object (e.g. color, rotation, size, animation, brightness, luminosity, contrast, or others). In some examples, elements 402-418 may be invoked when, for example, a drop-down menu selection is chosen, a mouse click occurs, a keystroke is detected, or another type of input is received. In other examples, one or more of elements 404-418 may be presented when element 402 is selected, causing element 402 to be ghosted as elements 404-418 are presented. Likewise, if one or more of elements 404-418 are selected, the unselected elements may be ghosted in order to provide a visually distinguishing presentation of graphical representation 400. When presented, graphical representation 400 and elements 402-418 provide options that may be selected by a user when working with an object using, for example, a visual, movie, animation, graphic, or other type of authoring or editing application, without limitation. In other examples, graphical representation 400 and the above-described elements may be implemented differently and are not limited to the configurations, appearances, designs, layouts, functions, or features described.

Figure 4B:
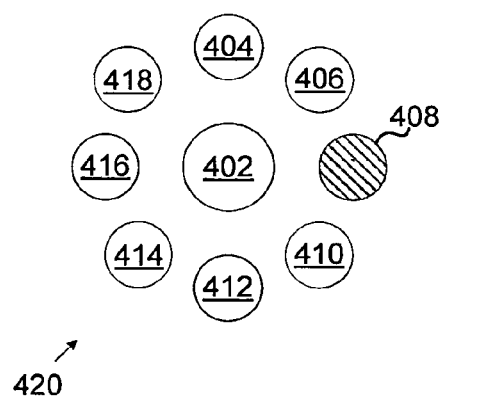
FIG. 4B is another illustration of an alternative exemplary visual and functional transform.

FIG. 4B is another illustration of an alternative exemplary visual and functional transform. Here, graphical representation 400 also includes elements 402-418. In some examples, when graphical representation 420 is presented and an option (e.g., element 408) is selected, the selected element may be visually distinguished from unselected elements (e.g., elements 402-406 and 410-418) by, for example, using shading, reducing or increasing opacity, or modifying another visual characteristic of the selected elements differently than visual characteristics of unselected elements. As an example, element 408 may be selected and visually distinguished by presenting element 408 using cross hatching, shading, or different colors apart from elements 402-406 and 410-418. In other examples, element 408 may be ghosted differently than elements 402-406 and 410-418. Further, graphical representation 420 and the above-described elements may be implemented differently and are not limited to the examples provided.

Figure 4C:
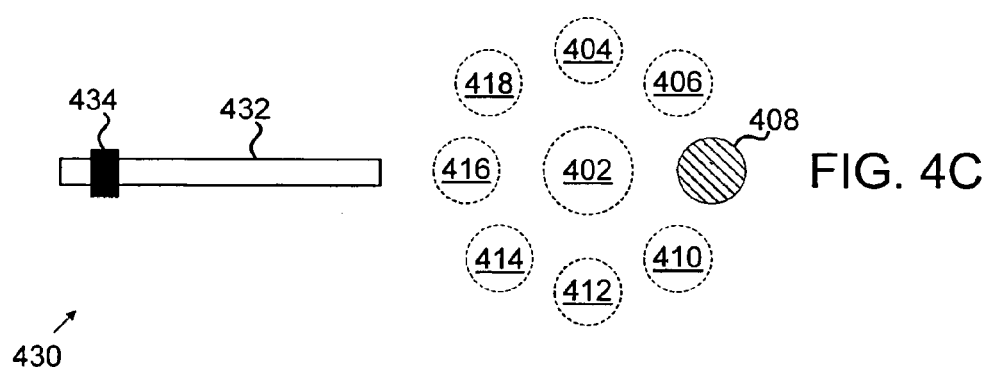
FIG. 4C is yet another illustration of an alternative exemplary visual and functional transform.

FIG. 4C is yet another illustration of an alternative exemplary visual and functional transform. Here, element 408 is presented selected (i.e., darkened or shaded, although different visual indications of selection may be used and are not limited to the examples provided). As shown here, when element 408 is selected, unselected elements 402-406 and 410-418 are ghosted. As shown here, when element 408 is selected, slide bar 432 and slide indicator 434 are invoked. Here, slide bar 432 and slide indicator 434 may be controls configured to modify a parameter associated with an object. In some examples, invoked controls may be rendered and presented using a radial pattern, icon, avatars, widgets, alphanumeric text fields, and others. In other examples, when element 408 is selected, controls (e.g., slide bar 432, slide indicator 434, and others) may be invoked and are not limited to the descriptions provided. Further, graphical representation 430 and the above-described elements may be varied in design, layout, function, or otherwise and is not limited to the examples shown and described.

Figure 4D:
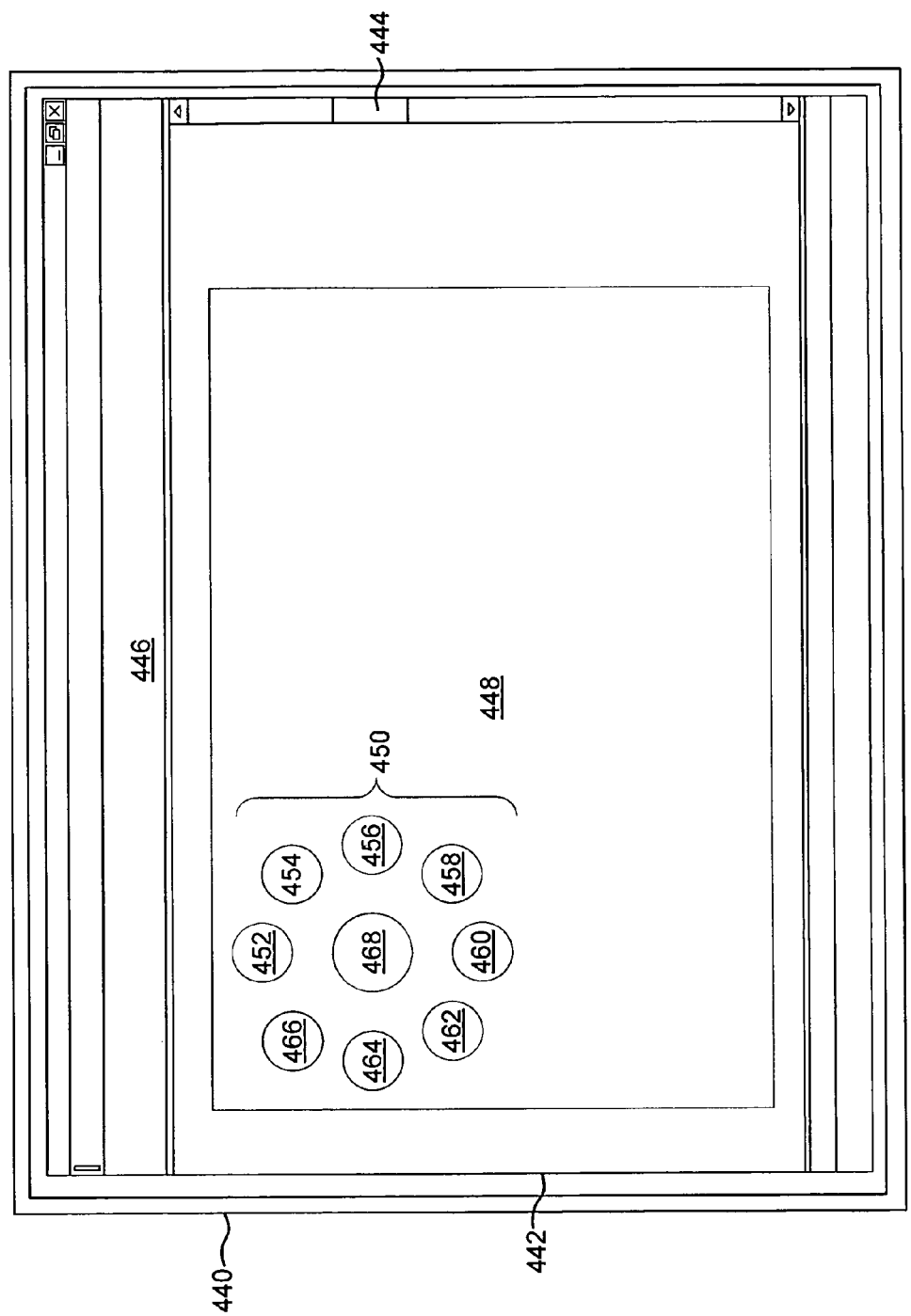
FIG. 4D illustrates an alternative exemplary interface having a visual and functional transform.

FIG. 4D illustrates an alternative exemplary interface having a visual and functional transform. Here, interface 440 includes display 442, scroll bar 444, panel 446, object 448, graphical representation 450, and elements 452-468. Here, elements 452-468, graphical representation 450, and object 448 are presented in display 442. In some examples, elements 452-468 and graphical representation 450 may be presented on panel 446. In other examples, elements 452-468 and graphical representation 450 may be presented elsewhere in interface 440 and are not limited to the examples provided.

Here, graphical representation 450 is presented as a radial-based geometric shape. In other examples, the shape, function, presentation, or configuration graphical representation 450 may be varied and is not limited to the description provided. As shown here, graphical representation 450 includes elements 452-466. In other examples, the quantity of elements 452-468 comprising graphical representation 450 may be varied and is not limited to the descriptions provided. Here, elements 452-468 indicate formatting options (e.g. color, rotation, size, special effects, or others) associated with object 448. In other examples, elements 452-468 may indicate other options associated with object 448 and are not limited to the descriptions provided. As an example, graphical representation 450 may be invoked using various types of inputs, including keystrokes, menu selections, mouse clicks, or any other type of user or system-generated input. In other examples, graphical representation 450 may be invoked differently. Further, interface 440, graphical representation 450, and the above-described elements may be varied in design, layout, function, or otherwise and is not limited to the examples shown and described.

Figure 4E:
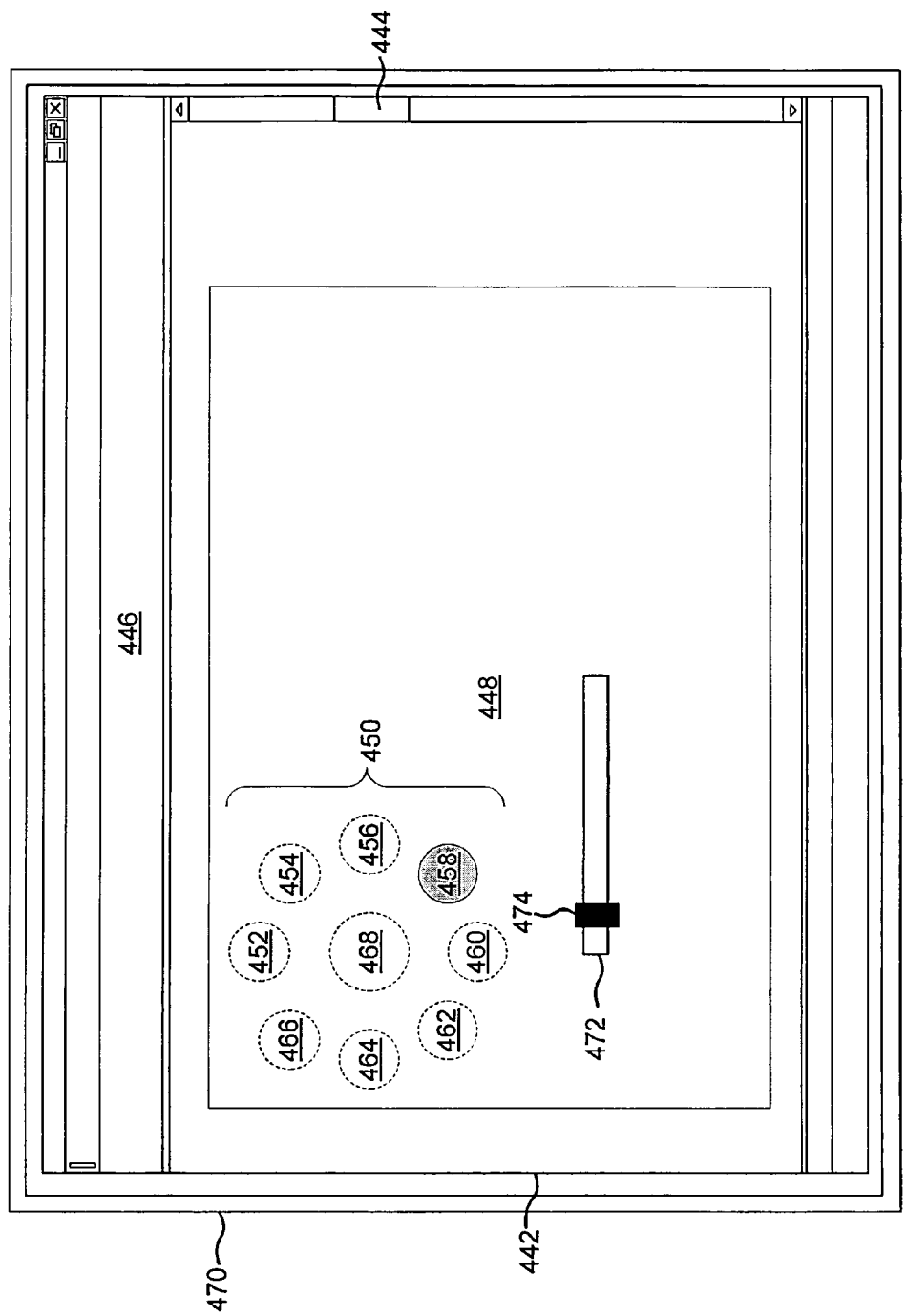
FIG. 4E illustrates a further alternative exemplary interface having a visual and functional transform.

FIG. 4E illustrates a further alternative exemplary interface having a visual and functional transform. Here, interface 470 includes display 442, scroll bar 444, panel 446, object 448, graphical representation 450, elements 452-468, slide bar 472, and slide indicator 474. Here, elements 452-468, graphical representation 450, and object 448 are presented in display 442. In some examples, elements 452-466 and graphical representation 450 may be presented on panel 446. In other examples, elements 452-468 and graphical representation 450 may be presented elsewhere in interface 470 and are not limited to the examples provided.

Here, graphical representation 450 is presented as a radial-based geometric shape. In other examples, the configuration of the appearance of graphical representation 450 may be varied and is not limited to the description provided. As shown here, graphical representation 450 includes elements 452-468. In other examples, the quantity of elements 452-468 comprising graphical representation 450 may be varied and is not limited to the descriptions provided. Here, elements 452-468 indicate formatting options (e.g. color, rotation, size, special effects, or others) associated with object 448. In other examples, elements 452-468 may indicate other options associated with object 448 and are not limited to the descriptions provided.

Here, element 458 is presented selected (i.e., darkened or shaded, although different visual indications of selection may be used and are not limited to the examples provided). As shown here, when element 458 is selected, unselected elements 452-456 and 460-468 are ghosted. As shown here, when element 458 is selected, slide bar 472 and slide indicator 474 are invoked. Here, slide bar 472 and slide indicator 474 may be a control configured to modify a parameter associated with object 448 when an option (i.e., one or more of elements 452-468) is selected. In some examples, controls may be invoked, rendered, and presented using a radial pattern, an icon, or an alphanumeric text field, or others. In other examples, controls may be varied in function, design, function, and other aspects, and are not limited to the descriptions provided. Further, interface 470, graphical representation 450, and the above-described elements may be varied in design, layout, function, or otherwise and is not limited to the examples shown and described.

Figure 5:
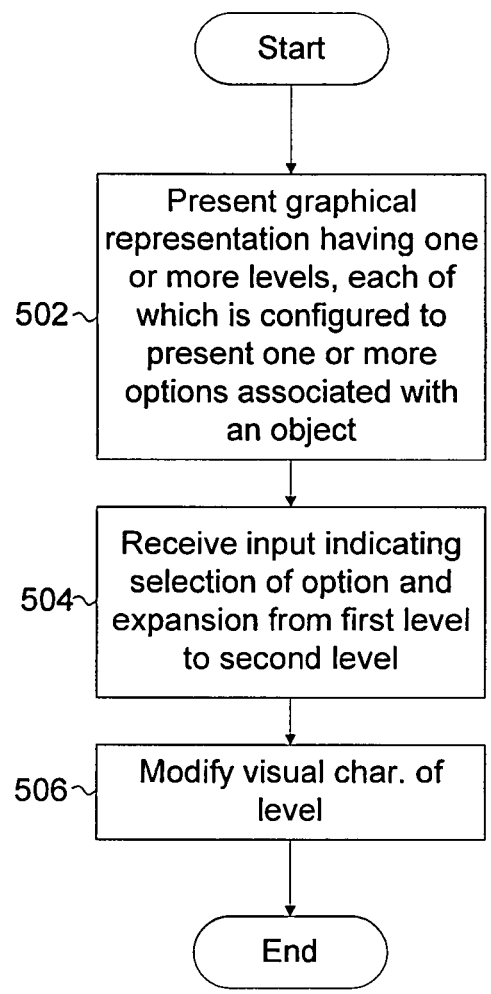
FIG. 5 illustrates an exemplary process for a visual and functional transform.

FIG. 5 illustrates an exemplary process for a visual and functional transform. In some examples, a graphical representation is presented having one or more levels that are configured to present one or more options associated with an object (502). A graphical representation may be any type of visual or functional transform that may be configured to expand to one or more different geometric shapes (i.e., levels) that are visually or graphically distinguished from each other by modifying one or more visual characteristics (e.g., surface treatments, textures, colors, opacity, borders, highlighting, or other graphical features). An input may be received which indicates selection of an option associated with the object and expansion or modification of a transform in order to present the selected option (504). Further, a visual characteristic (e.g., surface treatments, textures, colors, opacity, borders, highlighting, or other graphical features) associated with the object may be modified based on the input (506). The above-described process may be varied in function, processes and performed in any arbitrary order and is not limited to the examples shown and described.

Figure 6:
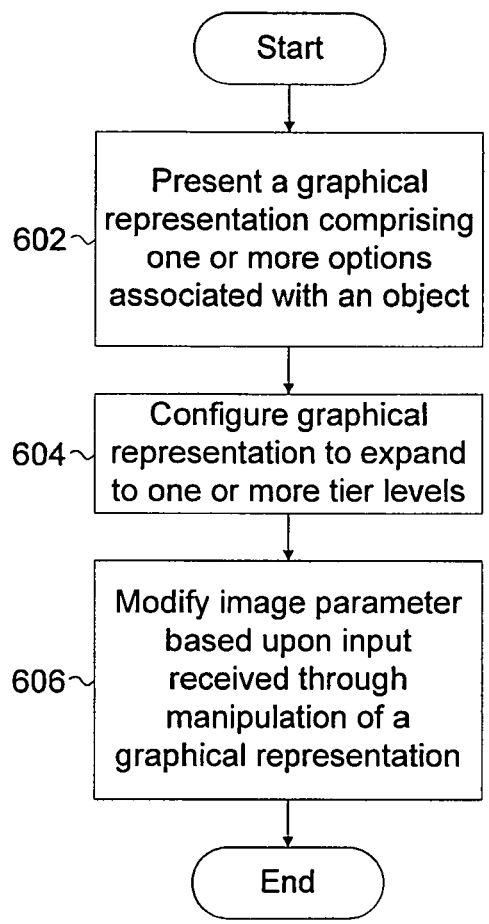
FIG. 6 illustrates an alternative exemplary process for a visual and functional transform.

FIG. 6 illustrates an alternative exemplary process for a visual and functional transform. In some examples, a graphical representation configured to present elements associated with one or more options associated with an object may be presented (602). Further, a graphical representation may be configured to expand to one or more levels (604). A parameter of an object may be modified based upon input received from manipulation of the graphical representation (606). The above-described process may be varied in function, processes and performed in any arbitrary order and is not limited to the examples shown and described.

Figure 7:
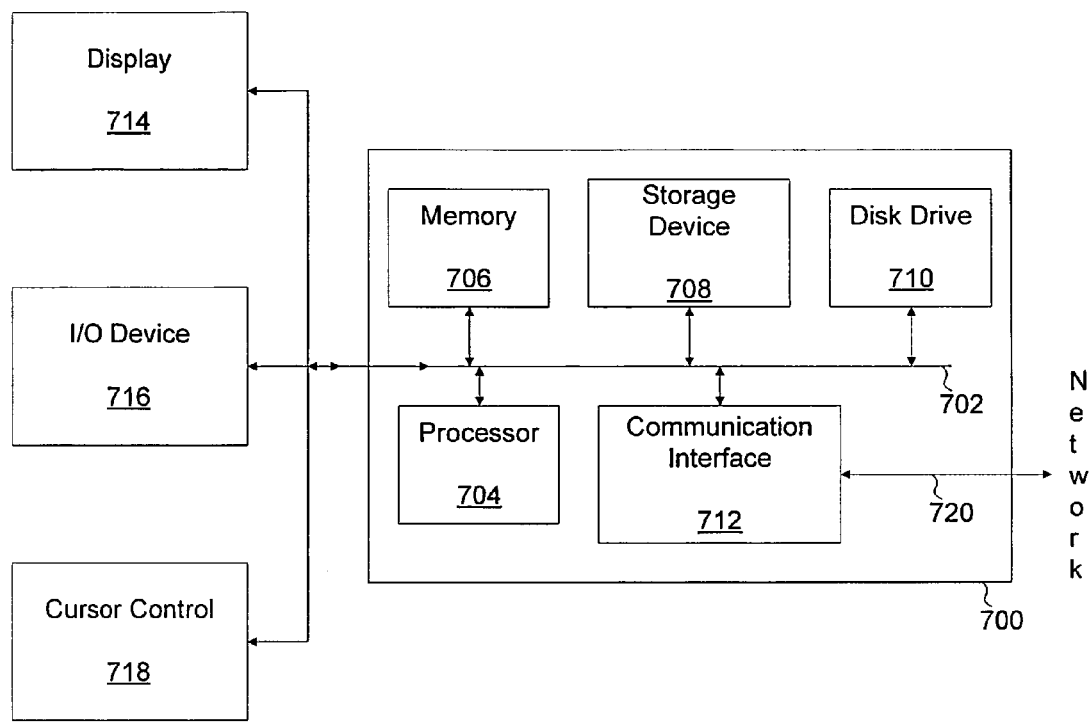
FIG. 7 illustrates an exemplary computer system suitable to implement a visual and functional transform.

FIG. 7 illustrates an exemplary computer system suitable to implement a visual and functional transform. In some examples, computer system 700 may be used to implement computer programs, applications, methods, processes, or other software to perform the above-described techniques. Computer system 700 includes a bus 702 or other communication mechanism for communicating information, which interconnects subsystems and devices, such as processor 704, system memory 706 (e.g., RAM), storage device 708 (e.g., ROM), disk drive 710 (e.g., magnetic or optical), communication interface 712 (e.g., modem or Ethernet card), display 714 (e.g., CRT or LCD), input device 716 (e.g., keyboard), and cursor control 718 (e.g., mouse or trackball).

According to some examples, computer system 700 performs specific operations by processor 704 executing one or more sequences of one or more instructions stored in system memory 706. Such instructions may be read into system memory 706 from another computer readable medium, such as static storage device 708 or disk drive 710. In some examples, hard-wired circuitry may be used in place of or in combination with software instructions for implementation.

The term "computer readable medium" refers to any medium that participates in providing instructions to processor 704 for execution. Such a medium may take many forms, including but not limited to, non-volatile media, volatile media, and others. Non-volatile media includes, for example, optical or magnetic disks, such as disk drive 710. Volatile media includes dynamic memory, such as system memory 706. Transmission media includes coaxial cables, copper wire, and fiber optics, including wires that include bus 702 for transmitting a computer data signal.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In some examples, execution of the sequences of instructions may be performed by a single computer system 700. According to some examples, two or more computer systems 700 coupled by communication link 720 (e.g., LAN, PSTN, or wireless network) may perform the sequence of instructions in coordination with one another. Computer system 700 may transmit and receive messages, data, and instructions, including program, i.e., application code, through communication link 720 and communication interface 712. Received program code may be executed by processor 704 as it is received, and/or stored in disk drive 710, or other non-volatile storage for later execution.

The foregoing examples have been described in some detail for purposes of clarity of understanding, but are not limited to the details provided. There are many alternative ways and techniques for implementation. The disclosed examples are illustrative and not restrictive.

What is claimed is:

1. A method comprising:
presenting a graphical representation comprising a first level, including a plurality of options associated with an object;
receiving an input to select one of the plurality of options related to modifying a parameter associated with the object; and
responsive to the receiving:
initiating expansion of the graphical representation from the first level to a second level, the second level including another plurality of options associated with the object;
modifying a visual characteristic of displayed unselected options of the first level to graphically distinguish the displayed unselected options of the first level from the another plurality of options of the second level as a part of the initiated expansion; and
displaying a slide bar to modify the parameter associated with the object.

2. The method of claim 1, wherein the receiving the input further comprises modifying a parameter associated with the object.

3. The method of claim 2, further comprising applying the parameter to the object after the modifying is performed.

4. The method of claim 1, wherein the visual characteristic is opacity.

5. The method of claim 1, wherein the visual characteristic is highlighting.

6. The method of claim 1, wherein modifying the visual characteristic further comprises ghosting.

7. The method of claim 1, wherein modifying the visual characteristic further comprises modifying a border.

8. The method of claim 1, wherein the graphical representation is a quadrant-based geometric shape.

9. The method of claim 1, wherein the graphical representation is a radial-based geometric shape.

10. The method of claim 1, wherein the input is provided by manipulating a radial element.

11. The method of claim 1, wherein the input is provided by selecting an icon.

12. The method of claim 1, wherein the input comprises an alphanumeric entry.

13. A method comprising:
   presenting a level of a transform, the level comprising a plurality of options associated with an object;
   receiving an input to select one of the plurality of options related to modifying a parameter associated with the object; and
   responsive to the receiving:
      initiating a modification of the transform by presenting another level, the another level including another plurality of options associated with the object;
      modifying the displayed unselected options of the level; and
      displaying a slide bar to modify the parameter associated with the object.

14. The method of claim 13, wherein the transform is a geometric shape.

15. The method of claim 13, wherein the transform is a quadrant-based geometric shape.

16. The method of claim 13, wherein the transform is a radial-based geometric shape.

17. A system comprising:
   one or more processors; and
   memory coupled to the one or more processors, the memory comprising instructions executable by the one or more processors to:
      present a graphical representation comprising a first level, the first level including a plurality of options associated with an object;
      receive an input to select one of the plurality of options related to modifying a parameter associated with the object; and
      responsive to the received selection:
         initiate expansion of the graphical representation from the first level to a second level, the second level including another plurality of options associated with the object;
         modify a visual characteristic of displayed unselected options of the first level to graphically distinguish the displayed unselected options of the first level from the another plurality of options as a part of the initiated expansion; and
         display a slide bar to modify the parameter associated with the object.

18. One or more computer-readable storage devices comprising instructions that responsive to execution by one or more processors, cause the one or more processors to:
   present a graphical representation comprising a first level, the first level including a plurality of options associated with an object;
   receive an input to select one of the plurality of options related to modifying a parameter associated with the object; and
   responsive to the received selection:
      initiate expansion of the graphical representation from the first level to a second level, the second level including another plurality of options associated with the object;
      modify a visual characteristic of displayed unselected options of the first level to graphically distinguish the displayed unselected options of the first level from the another plurality of options of the second level as a part of the initiated expansion; and
      display a slide bar to modify the parameter associated with the object.

* * * * *